United States Patent [19]
Blackmon

[11] Patent Number: 4,974,668
[45] Date of Patent: Dec. 4, 1990

[54] LDR CENTRIFUGAL COLLECTOR APPARATUS

[75] Inventor: James B. Blackmon, Irvine, Calif.

[73] Assignee: The United States of America as represented by the Secretary of the Air Force, Washington, D.C.

[21] Appl. No.: 486,346

[22] Filed: Feb. 28, 1990

[51] Int. Cl.⁵ .................. F28D 15/00; B64G 1/50
[52] U.S. Cl. ................. 165/104.31; 165/41; 165/904; 244/158 R; 244/163
[58] Field of Search ............ 165/41, 104.31, 104.28, 165/904; 244/158 R, 163

[56] References Cited

U.S. PATENT DOCUMENTS

| | | | |
|---|---|---|---|
| 3,363,676 | 1/1968 | Hunter, Jr. | 165/86 |
| 4,572,285 | 2/1986 | Botts et al. | 165/104.28 |
| 4,580,748 | 4/1986 | Dalby | 244/158 R |
| 4,603,732 | 8/1986 | Niggemann | 165/41 |
| 4,658,592 | 4/1987 | Wagner et al. | 165/110 |
| 4,702,309 | 10/1987 | Frank | 165/104.31 |
| 4,706,740 | 11/1987 | Mahefkey | 165/104.14 |
| 4,738,304 | 4/1988 | Chalmers et al. | 165/13 |
| 4,913,225 | 4/1990 | Chubb | 165/41 |

Primary Examiner—Albert W. Davis, Jr.
Attorney, Agent, or Firm—Jacob N. Erlich; Donald J. Singer

[57] ABSTRACT

A liquid droplet radiation centrifugal collector apparatus utilizing a conical-shaped collector with a deflector at its apex to direct a received droplet stream to a trough that is formed within the leading edge of the collector. The collector which is rotating imparts a dynamic pressure to the fluid that is accumulated in the trough. The fluid is intercepted by pitot tubes which are stationary, and is directed to a high pressure pump for return to the power generating system.

16 Claims, 1 Drawing Sheet

LDR CENTRIFUGAL COLLECTOR APPARATUS

STATEMENT OF GOVERNMENT INTEREST

The invention described herein may be manufactured and used by or for the Government for governmental purposes without the payment of any royalty thereon.

BACKGROUND OF THE INVENTION

The present invention relates broadly to a liquid collector apparatus, and in particular to a liquid droplet radiator (LDR) centrifugal collector apparatus.

The state of the art of centrifugal collectors are well represented and alleviated to some degree by the prior art apparatus and approaches which are contained in the following U.S. Patents:

U.S Pat. No. 4,572,285 issued to Botts et al on Feb. 25, 1986;
U.S. Pat. No. 4,580,748 issued to Dolby on Apr. 8, 1986;
U.S. Pat. No. 4,702,309 issued to Frank on Oct. 27, 1987;
U.S. Pat. No. 4,706,740 issued to Mahefkey on Nov. 17, 1987; and
U.S. Pat. No. 4,738,304 issued to Chalmer et al on Apr. 19, 1988.

The Botts et al patent describes a magnetically focused liquid drop radiator for application in rejecting energy from a spacecraft, characterized by a magnetizable liquid or slurry disposed in operative relationship within the liquid droplet generator and its fluid delivery system, in combination with magnetic means disposed in operative relationship around a liquid droplet collector of the LDR.

The Dolby patent is directed to an improved passive thermal radiator for an earth orbiting satellite having a despun interior portion supporting heat generating elements and a spinning exterior portion having a thermal radiator for heat radiated by these elements.

The Frank patent discloses a collector for a liquid droplet radiator for cooling at least one fluid droplet stream. The collector has a housing with at least one inlet for at least one fluid droplet stream and one outlet and lies in a plane, and a pump disposed in the housing and which has a low pressure side and lies in a plane which is the same as the plane that the housing lies in.

The Mahefkey patent discusses a system for radiating heat generated by a source of heat abroad a spacecraft or the like which comprises a pair of spaced heat pipes and a pair of spaced wall members having inner condensation surfaces and outer heat radiating surfaces bonded to the heat pipes and defining a vapor chamber, a rewet artery of capillary wicking material disposed within the vapor chamber between the heat pipes and extending substantially lengthwise of the vapor chamber, a source of expendable liquid heat exchange medium operatively connected to the rewet artery for maintaining an inventory of heat exchange medium within the vapor chamber for venting vapor overpressure.

The Chalmer et al patent delineates a direct condensation radiator for a spacecraft which utilizes an arrangement for redundant channels for the flow of coolant to heat radiating panels, micrometeroid resisting bumpers located adjacent the channels for preventing penetration by all but the most energetic micrometeroids, and a sensing and control arrangement for sensing the penetration of a coolant channels for shutting of that channel to prevent loss of coolant.

The rejection of waste heat from a power-conversion system is a critical requirement of virtually all proposed space installations. The problem is especially critical for advanced, high-power spacecraft. Current systems for heat rejection in space rely primarily on proven heat-pipe radiators. However, these radiators comprise a large fraction of the total mass of the power system. A lighter and more efficient radiator would have significant benefits for a wide variety of future projects.

While the above-cited references are instructive, it is clear that a need remains to provide a centrifugal liquid collector apparatus which solves the shortcomings of the prior art. The present invention is intended to satisfy that need.

SUMMARY OF THE INVENTION

The present invention utilizes a collector of liquid droplets for the rejection of waste heat in a liquid which is used in a power conversion system. The collector which is rotating, directs the liquid droplets to stationary pickup tubes that return the liquid to the generator system.

It is one object of the present invention, therefore, to provide an improved liquid droplet radiator (LDR) centrifugal collector apparatus.

It is another object of the invention to provide an improved centrifugal collector apparatus wherein a rotating collector forces the fluid to an outer trough.

It is still another object of the invention to provide an improved centrifugal collector apparatus wherein the collector rotation produces the dynamic and static pressure head to pump the fluid to a higher pressure primary pump.

It is yet another object of the invention to provide an improved centrifugal collector apparatus wherein a wake shield is utilized to prevent fluid flow up the stem of the pitot tube.

It is still a further object of the invention to provide an improved centrifugal collector apparatus which develops a high net positive suction head without cavitation.

These and other advantages, objects and features of the invention will become more apparent after considering the following description taken in conjunction with the illustrative embodiment in the accompanying drawings.

DESCRIPTION OF THE PREFERRED EMBODIMENT

Figure 1:
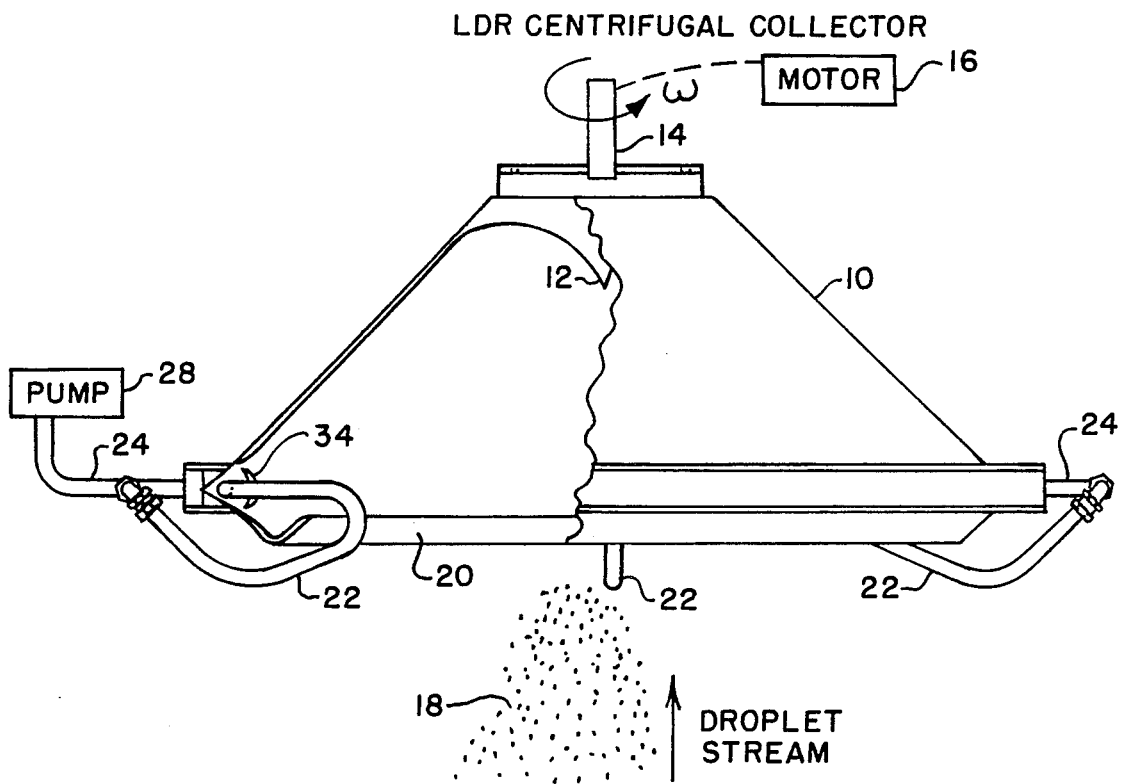
FIG. 1 is a plan view, partially in section, of the liquid droplet radiator (LDR) centrifugal collector apparatus according to the present invention.

Referring now to FIG. 1, there is shown a plan view, partial section, of the liquid droplet radiator (LDR) centrifugal collector apparatus comprising a conical-shaped member 10. The conical-shaped member 10 has a first and second end. The first end of the conical-shaped member 10 which is substantially larger than the second end, forms an opening to the interior of the conical-shaped member 10. The second end of the conical-shaped member 10 is sealed to form a closed container. An impingement deflector 12 is provided within the conical-shaped member at the second end. The impingement deflector 12 extends from the sides of the conical-shaped collector member 10. The impingement deflector 12 is arranged such that the incoming droplet stream 18 is directed to the walls of the collector member 10. The collected member 10 is rotated about shaft 14 by a motor 16 which is operatively connected thereto. The droplet stream 18 travels down the walls of the collector member 10 to a V-shaped trough 20 which located at the first end of the collector member and extends the complete length of thereof. The droplet stream 18 collector in the trough 20 and acquires a dynamic pressure. A number of pitot tubes 22 are positioned in the trough 20 to receive the accumulated fluid. The pitot tubes 22 are connected to a hose assembly 24 which direct the accumulated fluid to a high pressure pump 28. The high pressure pump 28 directs the fluid back to a power generating/converting system (not shown).

Figure 2:
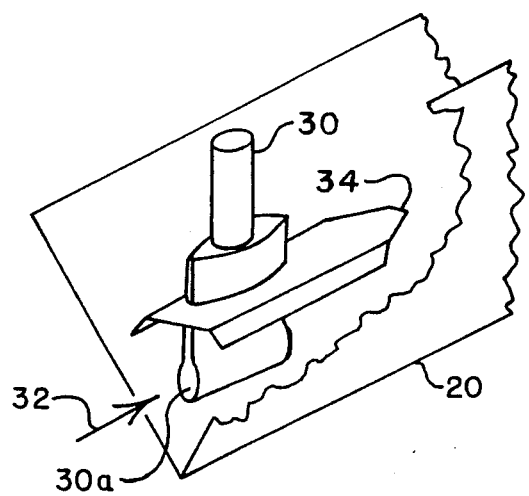
FIG. 2 is a perspective view of a single pitot tube positioned in the fluid trough.

In FIG. 2, there is shown in greater detail a perspective view of a single pitot tube 30. The pitot tube entrance 30a is positioned in the V-shaped trough 20 to intercept the moving fluid 32. The pitot tube 30 includes a wake shield 34 which is also shown in FIG. 1. As discussed earlier, the V-shaped trough 20 which contains the fluid 32, is moving with respect to the stationary pitot tube 30 and as a result, a dynamic pressure is imparted to the fluid 32. This dynamic pressure pushes the fluid 32 into pitot tube entrance 30a and thus into pitot tube 30 itself.

The present liquid droplet radiator centrifugal collector operates in the following manner. The droplet stream enters the collector and impinges on a deflector plate. The rotating collector then forces the fluid to the outer trough. A thick fluid film builds in the trough and impinges on one of any number of stationary pitot tubes. The pitot tube is an aerodynamically shaped strut which pierces the fluid film free surface. The dynamic and static head which is produced by the collector rotation, pumps the fluid through the pitot tube and provides sufficient NPSH to the higher pressure primary pump. A wake shield is attached to the pitot tube and is located just above the fluid free surface to prevent fluid flow up the stem of the pitot tube. This flow is redirected to the rear of the tube to reduce wake effects and cavitation. This shield is also effective in minimizing splashing effects.

With a centrifugal collector, the generator-produced droplet streams are focused to a vertex of a centrifugal collector apparatus. Upon striking the rotating collector, the stream would be spun to the outer rim of the collector where it would form a thick annular film which would impinge on stationary pickup or pitot tubes. The dynamic pressure that is thus developed, provides the initial force to pump the fluid into the system primary high pressure pump which would return the liquid to the generators. The centrifugal collector offers the following advantages over linear collectors:

1. Generates 1-10g centrifugal body force with low Froude Numbers. Proven collection capability in −1 g (upside down).
2. Azimuthal wave formation can occur but good viscous damping can be achieved. A centrifugal collector is insensitive to spacecraft induced motions.
3. Heat inlet NPSH is developed without cavitation.
4. Triangular structural configuration has excellent resistance to deflection and torsional moments.
5. The collector is small (typically about 1 m in diameter) and requires low fluid inventory. The high body forces relative to the low-g environment at very low rpm provide excellent startup/shutdown capabilities.
6. Negligible potential fluid loss with system shutdown. The collector has excellent capability to employ with little residual liquid remaining.
7. The collector weight is reduced by 40-50 percent due to a smaller collector.
8. The collector location is not restricted, rather it can be positioned to minimize possible contamination and leads to smaller contamination shields.
9. The centrifugal collector requires relatively low rpm's at 5-20 g (150-200 rpm) and produces a NPSH of 1-4 psi.
10. The design of the centrifugal collector lends itself to being easily handled, removed, replaced, cleaned and inspected.
11. Its small area makes it easy and mass efficient to protect against micrometeorites and space debris.
12. The collector can easily be tested under "worst case" conditions of −1 g (upside down). Only a few zero-g confirmation tests would subsequently be needed.

The centrifugal collector apparatus may be utilized in space application which involves the use and control of:
1. Liquid Droplet Radiator;
2. Separators; or
3. Zero-g fluid management.

The following features are achieved by the LDR centrifugal collector apparatus:
1. Droplet stream collection is provided in a small area by induced body forces thereby eliminating the need for long complex gear driven linear collectors;
2. Outflow of the collector is controlled by the collector rotation rate, size, and number of pitot tubes;
3. Aerodynamically shaped pitot tube and wake shield minimize drag coefficient and collector power requirements;
4. Collector design minimizes droplet loss due to splashing; and
5. System mass and power levels are reduced over linear collectors.

The Liquid Droplet Radiator (LDR) is an advanced radiator apparatus that offers significant mass, development, assembly, and operational advantages relative to the finned tube or heat pipe radiators used in current space vehicles. See FIG. 1. The LDR employs a sheet of droplets as a radiating surface and therefore eliminates the heavy metal radiating surface of conventional heat-pipe radiators.

For currently envisioned systems, droplets of a heat-transfer fluid (e.g., vacuum pump oils, liquid metals) approximately 50-200 microns in diameter would be ejected from droplet generators at 5-20 meters per second. The radiating area for large space systems of 5-20 megawatts thermal would be approximately half the size of a football field. Droplets would be ejected towards a collector over distances of 10-50 meters. During their several seconds of flight, they would radiate energy to space. The droplet stream would be gathered at the collector and pumped into a higher pressure pump, sending the liquid back in the power conversion system. The reheated liquid would then be ejected through the generator again to cool and recirculate.

The Liquid Droplet Radiator concepts can be applied to other applications, ranging from small power systems to terrestrial or lunar power stations.

Although the invention has been described with reference to a particular embodiment, it will be understood to those skilled in the art that the invention is capable of a variety of alternative embodiments within the spirit and scope of the appended claims.

What is claimed is:

1. A liquid droplet radiator centrifugal collector apparatus comprising in combination:

a collector means having a first and second end, said first end being substantially larger than said second end, said first end forming an opening, said second end being sealed to form a container, said first end including a trough which is disposed within said collector means, said collector means arranged to receive a droplet stream at said first end, means for rotation operatively connected to said second end of said collector means, said rotation means imparting to said collector means a rotational force which causes said collector means to rotate, and, a pickup means operatively positioned within said collector means at said first end and within said trough, said pickup means is stationary with respect to said collector means, said droplet stream entering into said collector means and being deflected at said second end toward said first end and thence into said trough, said droplet stream accumulating in said trough and forming a fluid which has a dynamic pressure associated therewith, said pickup means intercepts said fluid and directs it a hose assembly wherein said fluid is applied to a pump.

2. A collector apparatus as described in claim 1 wherein said collector means has a substantially conical shape.

3. A collector apparatus as described in claim 1 wherein said trough has a substantially V shape.

4. A collector apparatus as described in claim 1 wherein said pickup means comprises a pitot tube.

5. A collector apparatus as described in claim 4 further including a wake shield which is operatively attached to said pitot tube to minimize splashing and to reduce wake effects.

6. A collector apparatus as described in claim 1 wherein said rotation means comprises a motor.

7. A collector apparatus as described in claim 1 wherein said pump comprises a high pressure pump which has an operating pressure that is higher than said dynamic pressure.

8. A collector apparatus as described in claim 1 wherein said droplet stream comprises droplets of liquids.

9. A collector apparatus as described in claim 1 further including an impingement deflector which is positioned within said collector means at said second end, said impingement deflector directs said droplet stream to said trough.

10. A collector apparatus as described in claim 9 wherein said collector means has a substantially conical shape.

11. A collector apparatus as described in claim 9 wherein said trough has a substantially V shape.

12. A collector apparatus as described in claim 9 wherein said pickup means comprises a pitot tube.

13. A collector apparatus as described in claim 12 further including a wake shield which is operatively attached to said pitot tube to minimize splashing and to reduce wake effects.

14. A collector apparatus as described in claim 9 wherein said rotation means comprises a motor.

15. A collector apparatus as described in claim 9 wherein said pump comprises a high pressure pump which has an operating pressure that is higher than said dynamic pressure.

16. A collector apparatus as described in claim 9 wherein said droplet stream comprises droplets of liquids.

* * * * *